(12) United States Patent
Hessling-Von Heimendahl et al.

(10) Patent No.: US 9,723,677 B2
(45) Date of Patent: Aug. 1, 2017

(54) AIRCRAFT LANDING LIGHT UNIT, EXTERIOR AIRCRAFT LIGHTING SYSTEM AND METHOD OF OPERATING AN AIRCRAFT LANDING LIGHT UNIT

(71) Applicant: Goodrich Lighting Systems GmbH, Lippstadt (DE)

(72) Inventors: Andre Hessling-Von Heimendahl, Koblenz (DE); Christian Schoen, Mainz (DE); Anil Kumar Jha, Lippstadt (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 15/158,874

(22) Filed: May 19, 2016

(65) Prior Publication Data

US 2016/0345401 A1    Nov. 24, 2016

(30) Foreign Application Priority Data

May 20, 2015    (EP) .................................... 15168342

(51) Int. Cl.
| | |
|---|---|
| *B64D 47/04* | (2006.01) |
| *H05B 33/08* | (2006.01) |
| *B60Q 1/14* | (2006.01) |
| *B64D 47/06* | (2006.01) |
| *F21V 5/04* | (2006.01) |
| *H05B 37/02* | (2006.01) |
| *F21Y 101/02* | (2006.01) |

(52) U.S. Cl.
CPC ....... *H05B 33/0854* (2013.01); *B60Q 1/1423* (2013.01); *B64D 47/04* (2013.01);
(Continued)

(58) Field of Classification Search
CPC ........ B64D 47/04; B64D 47/06; B64D 47/02; B64D 2203/00; H05B 37/02; H05B 37/0218; H05B 37/0227; H05B 33/0854; F21V 5/04; F21V 5/046; F21V 13/04; F21Y 2115/10; G08G 5/0021
(Continued)

(56) References Cited

U.S. PATENT DOCUMENTS

| | | |
|---|---|---|
| 4,603,973 A | 8/1986 | Crow |
| 5,315,296 A | 5/1994 | Kaiser |

(Continued)

FOREIGN PATENT DOCUMENTS

EP    2199152 A1    6/2010

OTHER PUBLICATIONS

European Search Report for application No. EP15168342.2; Mailing Date Nov. 23, 2015, 7 pages.

*Primary Examiner* — Haissa Philogene
(74) *Attorney, Agent, or Firm* — Cantor Colburn LLP

(57) ABSTRACT

An aircraft landing light unit includes a plurality of LEDs, an optical system associated with the plurality of LEDs for shaping a light output of the aircraft landing light unit for illuminating an aircraft environment, a control unit for controlling the plurality of LEDs, and a photo detector arranged for detecting light, emitted by the plurality of LEDs, output via the optical system and reflected by atmospheric haze, such as clouds, fog, rain and snow, wherein the control unit is coupled to the photo detector and is configured to control the plurality of LEDs on the basis of the light detected by the photo detector, thereby adjusting the light output of the aircraft landing light unit to the atmospheric haze.

15 Claims, 5 Drawing Sheets

(52) U.S. Cl.
CPC ............ *B64D 47/06* (2013.01); *F21V 5/04* (2013.01); *H05B 37/0218* (2013.01); *B64D 2203/00* (2013.01); *F21Y 2101/02* (2013.01)

(58) Field of Classification Search
USPC ....... 362/470, 241, 249.02; 315/77, 82, 297, 315/307, 224, 312
See application file for complete search history.

(56) References Cited

U.S. PATENT DOCUMENTS

| | | | |
|---|---|---|---|
| 6,126,299 A | 10/2000 | Hypes | |
| 6,152,577 A | 11/2000 | Rizkin | |
| 6,705,573 B2 * | 3/2004 | McDonnell | B64D 3/02 102/336 |
| 6,796,690 B2 | 9/2004 | Bohlander | |
| 7,755,515 B2 | 7/2010 | Hagan | |
| 8,045,760 B2 | 10/2011 | Stam | |
| 8,662,721 B2 | 3/2014 | Calvin | |
| 9,207,319 B2 * | 12/2015 | Starr | G01S 7/04 |
| 9,260,201 B2 * | 2/2016 | Hessling | B64D 47/06 |
| 2008/0137353 A1 | 6/2008 | Larsen | |
| 2011/0198997 A1 | 8/2011 | Curtis | |
| 2013/0094210 A1 | 4/2013 | Rice | |
| 2013/0155706 A1 | 6/2013 | Jha | |
| 2016/0076722 A1 * | 3/2016 | Hessling von Heimendahl | B64D 47/04 362/470 |
| 2016/0345408 A1 * | 11/2016 | Schoen | B64D 47/04 |

* cited by examiner

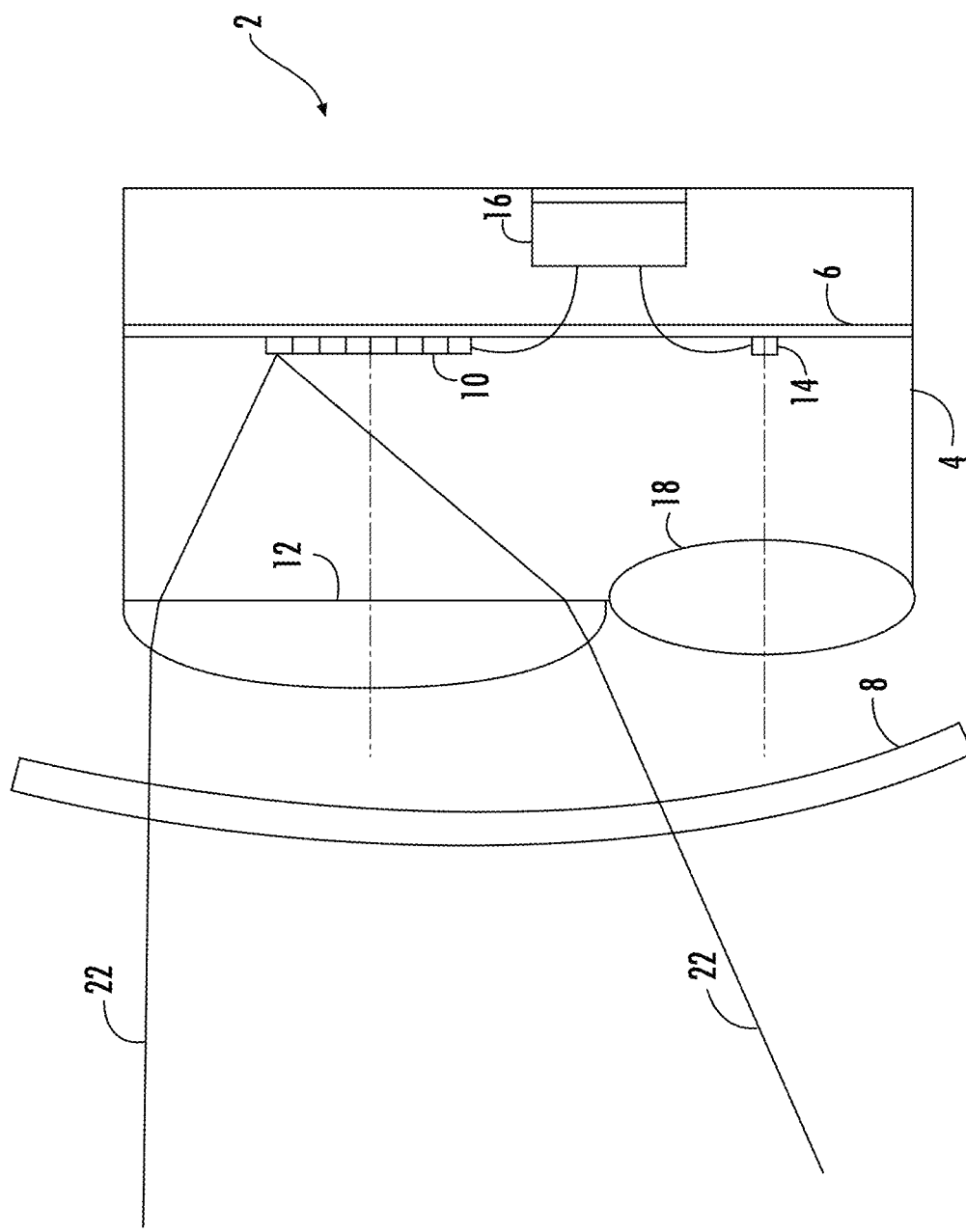

AIRCRAFT LANDING LIGHT UNIT, EXTERIOR AIRCRAFT LIGHTING SYSTEM AND METHOD OF OPERATING AN AIRCRAFT LANDING LIGHT UNIT

FOREIGN PRIORITY

This application claims priority to European Patent Application No. 15 168 342.2 filed May 20, 2015, the entire contents of which is incorporated herein by reference.

TECHNICAL FIELD

The present invention is in the field of exterior aircraft lighting. In particular, the present invention is in the field of aircraft landing lights and exterior aircraft lighting systems having such aircraft landing lights coupled to other light units.

BACKGROUND OF THE INVENTION

Almost all aircraft are equipped with exterior lights. For example, large passenger air planes have a wide variety of exterior lights. Examples are navigation lights or position lights, beacon lights, anti-collision lights or strobe lights, wing lights, taxi lights, landing lights, runway turnoff lights, etc. These lights provide for various kinds of illumination around the air plane. In particular, during a runway approach, a large number of exterior lights is commonly in operation, such as the navigation lights, beacon lights, anti-collision lights, landing lights, and in some cases also the taxi lights and runway turnoff lights. In conditions where the sky and/or the atmosphere around and above the airport runway is not clear, such as in cloudy, foggy, rainy or snowy conditions, generally referred to as atmospheric haze conditions herein, this large amount of light output bears the risk of leading to a deterioration of the pilot's vision due to light reflections from the atmospheric haze.

Accordingly, it would be beneficial to improve the exterior lighting of an aircraft in such a way that a blinding of the pilot/an impairment of the pilot's vision is reduced.

SUMMARY

Exemplary embodiments of the invention include an aircraft landing light unit, comprising a plurality of LEDs, an optical system associated with the plurality of LEDs for shaping a light output of the aircraft landing light unit for illuminating an aircraft environment, a control unit for controlling the plurality of LEDs, and a photo detector arranged for detecting light, emitted by the plurality of LEDs, output via the optical system and reflected by atmospheric haze, such as clouds, fog, rain and snow. The control unit is coupled to the photo detector and is configured to control the plurality of LEDs on the basis of the light detected by the photo detector, thereby adjusting the light output of the aircraft landing light unit to the atmospheric haze.

Exemplary embodiments of the invention allow for a strong reduction of the risk of the pilot's vision being impaired by reflected light during an approach to an airport runway. As aircraft landing lights emit a large amount of light in the pilot's forward vision direction, they present the greatest risk of impairing the pilot's vision due to the reflections from clouds, fog, rain or snow. By controlling the light output of the aircraft landing light unit as a response to the reflections by atmospheric haze, a one-step control operation is able to greatly alleviate the vision impairment experienced by the pilot. By carrying out a light detection operation at a single location and by controlling only a single exterior aircraft light unit, namely the aircraft landing light unit, as a response thereto, a large effect on the pilot's vision can already be achieved. In other words, the aircraft landing light unit according to exemplary embodiments of the invention allows for achieving a strong improvement of the pilot's vision in atmospheric haze conditions on the basis of a control of the plurality of LEDs of the aircraft landing light unit with low complexity, namely a control of the plurality of LEDs on the basis of the light detection of a photo detector within the aircraft landing light unit.

The term aircraft landing light unit refers to a light unit that is configured and intended for illuminating a landing target during an aircraft landing approach. The aircraft may be an air plane or a helicopter. Examples of the landing target are an air plane runway or a helicopter landing pad. The aircraft landing light unit is an exterior aircraft light unit. It may be configured and intended for being mounted to an exterior aircraft structure, such as to a front running gear of an air plane being deployed during the air plane approach to the runway.

The provision of the plurality of LEDs as light sources allows for providing an aircraft landing light unit that is highly power-efficient and has a long expected life time.

The optical system may be a single optical system that affects the light output of all of the plurality of LEDs, thus shaping the output light intensity distribution of the aircraft landing light unit. The plurality of LEDs may be a linear arrangement of LEDs or a two dimensional array arrangement of LEDs, with the optical system being arranged over the entire LED arrangement. The optical system may be a single optical lense, in particular a collimating lense, but may also consist of a plurality of optical elements such as lense(es), reflector(s) and or shutter(s). There may also be provided multiple optical systems, with each of these optical systems being associated with a respective subset of the entirety of the LEDs of the aircraft landing light unit.

The control unit may be coupled to the photo detector in various ways. For example, it is possible that the photo detector generates a light detection signal, continuously or periodically conveying information about the level of light detected by the photo detector. It is also possible that the photo detector performs some form of pre-processing of this information and signals particular events to the control unit, such as the level of light detection exceeding a particular threshold. Alternatively, all the processing of the raw light detection data may be performed by the control unit.

It is pointed out that the photo detector, being arranged within the aircraft landing light unit, does not detect the light actually reflected towards the pilot. However, it has been found that the light reflected back towards the aircraft landing light unit provides a good estimate of the reflection towards the pilot, and thus a good indication about the pilot's vision impairment. A reason for this good indication is the fact that atmospheric haze occurrences, such as clouds, fog, rain or snow, are commonly extended structures, being present in spaces that are often very large compared to aircraft extensions.

According to a further embodiment, the control unit is configured to compare the light detected by the photo detector to a reflection threshold value and to decrease the light output of the aircraft landing light unit as a response to the light detected by the photo detector being above the detection threshold value. In other words, if the light detected by the photo detector exceeds a reflection threshold value, the control unit controls the plurality of LEDs in such a way that the light output of the aircraft landing light unit is reduced. In yet other words, the light output of the aircraft landing light unit is decreased as compared to a normal operating mode of the aircraft landing light unit, also referred to as a nominal operating mode of the aircraft landing light unit, as a response to the light detected by the photo detector being above the reflection threshold value. In this way, a simple, but effective means for reducing the risk of having the pilot blinded by reflections is provided. The comparison with a reflection threshold value and an according reduction of the light output of the aircraft landing light unit results in an immediate decrease of the light reflected towards the pilot. The exceeding of the reflection threshold value may be the only indication for switching the operating mode of the aircraft landing light unit. In other words, it is possible that the aircraft landing light unit has two modes of operation, namely a nominal operating mode and a reduced light output operating mode, with the switching between those two modes being made in response to the comparison with the reflection threshold value. However, it is also possible that the control unit is configured to compare the light detected by the photo detector to a plurality of reflection threshold values, with one of an according number of operating modes being selected as a response thereto. It is further possible that the control unit reverts to a control function that assigns a particular control operation to every level of light detected by the photo detector. This control function may be a step function, in this way corresponding to the case of a plurality of reflection threshold values discussed above, or may be a continuous function without steps, assigning a continuously changing light output level to the amount of light detected by the photo detector.

It is pointed out that the control unit may decrease the light output temporarily, i.e. for a portion of the approach, or permanently, i.e. for the entire approach, as a response to the light detected by the photo detector being above the reflection threshold value. It is possible that the reduction of the light output brings the light detected by the photo detector below the reflection threshold value. This may not have anything to do with changed atmospheric conditions and may just be the result of the reduction of the light output. However, it is also possible that the atmospheric haze is passed by the aircraft and the changed atmospheric conditions would allow for a return to the nominal operating mode. In order to prevent any toggling between different light outputs, although the atmospheric conditions may be constant, it is possible that the control unit is configured to decrease the light output permanently. In order to give the aircraft landing light unit the chance to adapt to the atmospheric haze being passed, it is alternatively possible that the control unit is configured to decrease the light output for a predefined time interval. After the predefined time interval, the control unit may control the plurality of LEDs according to the nominal operating mode and may make a new comparison between the detected light and the reflection threshold value. It is also possible that a further reflection threshold value is provided, with the control unit being configured to increase the light output of the aircraft landing light unit again as a response to the light detected by the photo detector falling below the further reflection threshold value.

According to a further embodiment, the control unit is configured to dim all of the plurality of LEDs as a response to the light detected by the photo detector being above the reflection threshold value. In this way, the light intensity distribution of the aircraft landing light unit may be decreased in a proportional manner across all output angles, thus keeping the relative illumination of the different sectors of the aircraft environment the same and just reducing the overall brightness of the aircraft landing light unit.

According to an alternative embodiment, the plurality of LEDs comprises a first subset of LEDs and a second subset of LEDs, with the first and second subsets of LEDs being separately controllable, and the control unit is configured to dim the first subset of LEDs as a response to the light detected by the photo detector being above the reflection threshold value. In particular, while dimming the first subset of LEDs, the control unit may keep the light output from the second subset of LEDs unchanged, i.e. it may control the second subset of LEDs as in the nominal operating mode. In this way, the control unit may reduce the light output from those LEDs that are most prone to causing undesired reflections towards the cockpit, while keeping the illumination by the other LEDs constant. In this way, the pilot's vision impairment may be effectively reduced, while keeping the illumination of sectors where less blinding reflections are expected at a desired level. In this way, an optimised compromise between reducing the reflections towards the pilot and sufficient illumination for situational awareness for the pilot can be achieved. Also, this helps in maintaining passive visibility of the aircraft, e.g. by ground personnel on an airport.

According to a further embodiment, the plurality of LEDs comprises a first subset of LEDs and a second subset of LEDs, with the first and second subsets of LEDs being separately controllable, and the control unit is configured to switch off the first subset of LEDs as a response to the light detected by the photo detector being above the reflection threshold value. In this way, even more of a reduction of the undesired reflections towards the pilot can be achieved, while still ensuring a certain level of situational awareness for the pilot and maintaining a certain level of passive visibility. Again, the second subset of LEDs may be operated as in the nominal operating mode. However, it is also possible that the second subset of LEDs is dimmed.

According to a further embodiment, the first subset of LEDs provides for more illumination in a pilot forward vision direction than the second subset of LEDs. In this way, it can be achieved that those LEDs that emit light mainly towards the front and whose light is more probable to be rejected towards the pilot are dimmed down or switched off. Due to their different spatial positions, the different LEDs have different contributions to the light output of the aircraft landing light unit. The particular position of each LED and the particular relation to the optical system of each LED allow for different contributions of each LED to the overall light output. It can be determined which ones of the plurality of LEDs contribute more to the illumination in the pilot forward vision direction than other LEDs. These LEDs can then be selected for being dimmed or switched off, leading to a reduction of the illumination in the pilot forward vision direction, while maintaining a comparably larger amount of illumination in more lateral directions towards the left and right.

According to a further embodiment the second subset of LEDs provides for a broader field of illumination than the first subset of LEDs. In other words, a higher intensity illumination is provided over a small angular range by the first subset of LEDs, while a second subset of LEDs illuminates the aircraft environment over a wider angular range, in particular with less intensity. A broad basic illumination by the aircraft landing light unit may be upheld in this way, while reducing the high intensity illumination in the narrow cone around the forward flying direction of the aircraft.

According to a further embodiment, the reflection threshold value is a fixed threshold value. In this way, the control unit may provide for the controlling of the plurality of LEDs in accordance with an algorithm of very low complexity, only relying on the fixed threshold value.

According to an alternative embodiment, the reflection threshold value is a variable threshold value, set depending on an ambient light level around the aircraft landing light unit. For this purpose, the aircraft landing light unit may have an ambient light sensor. For higher ambient light, the reflection threshold value may be set to a higher value. In this way, the switching between different operating modes can be made dependent on the ambient light level, e.g. can be made dependent on night conditions versus day conditions. Such variable threshold value may account for the adaptation of the human eye to its surroundings. For example, a lower amount of reflected light may be blinding or disturbing to the pilot in night conditions than during day conditions. Accordingly, such variable threshold value may be suitable for a more targeted reduction of the disturbing reflections on the basis of the sensitivity of the human eye in certain weather conditions.

According to a further embodiment, the reflection threshold value is at least ten times as high as an expected reflection value, corresponding to a light reflection from an airport runway in clear sky conditions. Due to the runway commonly being made from concrete or asphalt or a combination thereof, it commonly diffusely reflects light, such that some of the light emitted by the aircraft landing light unit is reflected back towards the pilot. This effect makes the runway visible at night. Making the reflection threshold value dependent on this expected and intended reflection of the light from the aircraft landing light unit allows for a fairly reliable indication if weather conditions are present that deviate from the clear sky scenario. The expected reflection value may be the light reflection expected from the aircraft runway, including its immediate surroundings, because common output light intensity distributions of aircraft landing light units do not concentrate all light on the airport runway, but also illuminate some of the adjacent environment.

According to a further embodiment, the aircraft landing light unit further comprises a photo detector lens, associated with the photo detector for condensing reflected light towards the photo detector. In this way, the sensitivity requirements for the photo detector can be kept low. The photo detector lens bundles reflected light towards the photo detector, giving a clearer indication of the reflections caused by atmospheric haze. In a particular embodiment, the photo detector lens directs light from an expected reflection sector towards the photo detector, the expected reflection sector having an opening angle of between 20° and 40° in a horizontal direction and between 10° and 20° in a vertical direction. In this way, the expected reflection sector coincides or greatly overlaps with standard illumination sectors of aircraft landing light units, at least with respect to their sectors of illumination with the highest light intensity.

Further exemplary embodiments of the invention include an exterior aircraft lighting system, comprising an aircraft landing light unit, as described in accordance with any of the embodiments above, and at least one further exterior aircraft light unit, the at least one further exterior aircraft light unit being coupled to the photo detector of the aircraft landing light unit and being configured to control its respective light output on the basis of the light detected by the photo detector of the aircraft landing light unit. In this way, one or more other exterior aircraft light units, such as anti-collision light units, taxi light units (if already switched on during the approach) and runway turnoff light units (if already switched on during the approach), can also be controlled on the basis of the same light detection. In particular, it is possible to decrease the light output of these further exterior aircraft light units, reducing the risk of these further exterior aircraft lights also impairing the pilot's vision. The reflection threshold values for reducing the light output of these exterior aircraft light units may be the same as for the aircraft landing light unit or may be different. Further, the at least one further exterior aircraft light unit may be exactly one further exterior aircraft light unit. It is also possible that the at least one further exterior aircraft light unit is two or more exterior aircraft light units, with each of the exterior aircraft light units controlling its respective light output on the basis of the light detected by the photo detector of the aircraft landing light unit. The modifications, additional features and effects, described above with respect to the aircraft landing light unit, equally apply to the exterior aircraft lighting system.

According to a further embodiment, the at least one further exterior aircraft light unit is at least one anti-collision light unit. In particular the at least one further exterior aircraft light unit may be a left anti-collision light unit and a right anti-collision light unit, these anti-collision light units being disposed in the wing tips of the left and right wings of an air plane, respectively.

Exemplary embodiments of the invention further include an aircraft, comprising an aircraft landing light unit, as described in any of the embodiments above, and/or an exterior aircraft lighting system, as described in any of the embodiments above. The modifications, additional features and effects, described above with respect to the aircraft landing light unit and the exterior aircraft lighting system, equally apply to the aircraft.

Further exemplary embodiments of the invention include a method of operating an aircraft landing light unit, comprising a plurality of LEDs, an optical system associated with the plurality of LEDs, and a photo detector. The method comprises the steps of operating the plurality of LEDs in a nominal operating mode, thereby providing a light output of the aircraft landing light unit for illuminating an aircraft environment; detecting light, emitted by the plurality of LEDs, output via the optical system and reflected by atmospheric haze, such as clouds, fog, rain and snow; controlling the plurality of LEDs on the basis of the light detected by the photo detector, thereby adjusting the light output of the aircraft landing light unit to the atmospheric haze. Exemplary embodiments of the method of operating an aircraft landing light unit allow for the same effects discussed above with respect to the aircraft landing light unit. Method steps analogous to the structural features and modifications discussed above in the context of the aircraft landing light unit are explicitly disclosed herewith.

According to a further embodiment, the method of operating an aircraft landing light unit comprises the step of comparing the light detected by the photo detector to a reflection threshold value. The step of controlling the plurality of LEDs may comprise dimming a subset of the plurality of LEDs as a response to the light detected by the photo detector being above the reflection threshold value. In this way, above discussed effect of reducing the light output in sectors that are prone to causing undesired reflections towards the pilot can be achieved.

BRIEF DESCRIPTION OF DRAWINGS

Further exemplary embodiments of the invention are described with respect to the accompanying Figures, wherein:

FIG. 1a-FIG. 1b shows an aircraft landing light unit in accordance with an exemplary embodiment of the invention in a schematic view;

DETAILED DESCRIPTION OF THE INVENTION

Figure 1A:
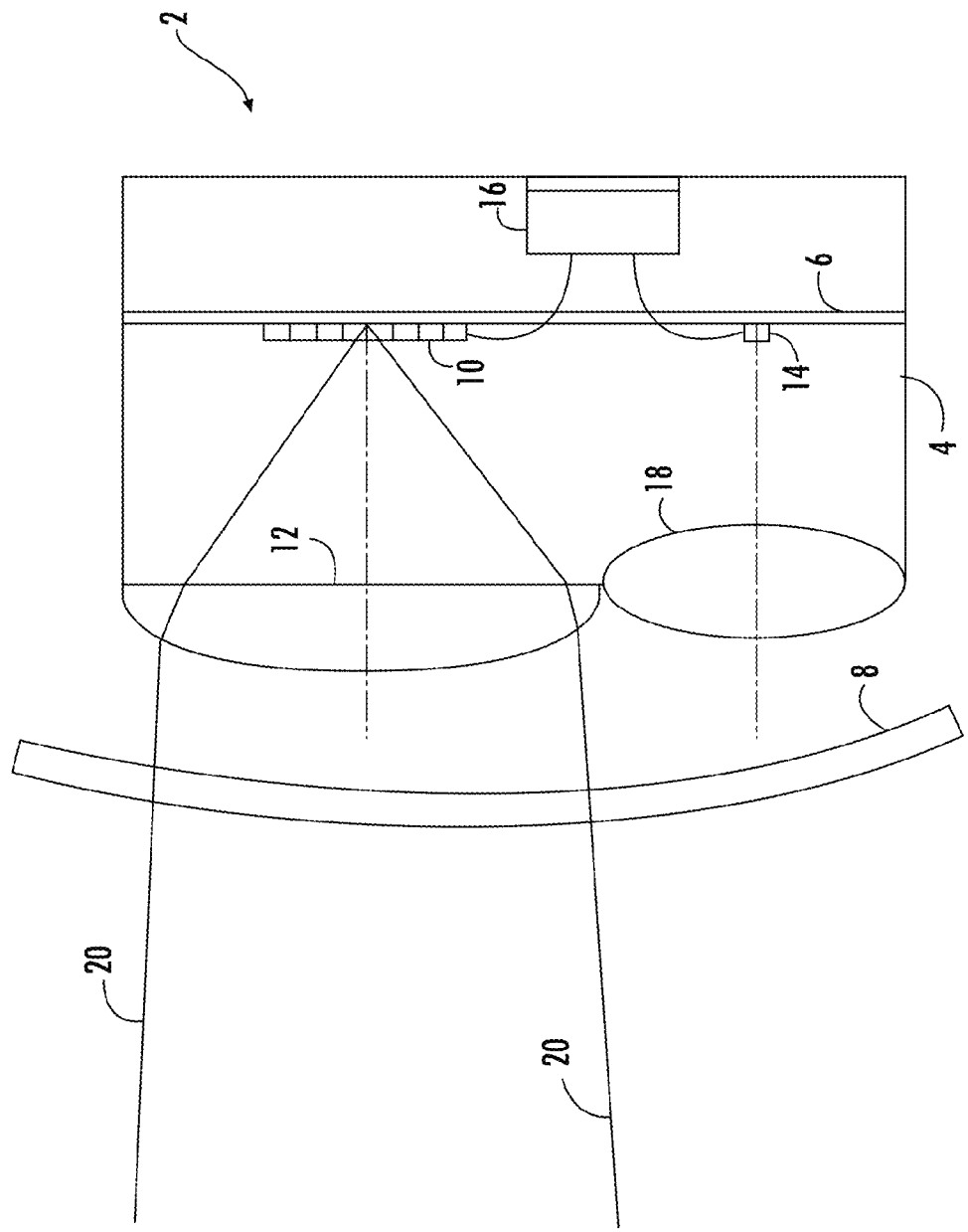

FIG. 1a shows an exemplary embodiment of an aircraft landing light unit 2 in accordance with the invention. The aircraft landing light unit 2 is shown in a cross-sectional, schematic view in the exemplary embodiment of FIG. 1a. The aircraft landing light unit 2 comprises a housing 4 and a mounting plate 6, to which most of the other elements of the aircraft landing light unit 2 are mounted. The mounting plate 6 is disposed within the interior of the housing 4. The aircraft landing light unit 2 further comprises a lens cover 8, which forms the outermost portion of the aircraft landing light unit 2 and through which the aircraft landing light unit 2 emits light.

The aircraft landing light unit 2 comprises a plurality of LEDs 10. In particular, the plurality of LEDs 10 are an array of LEDs. Further in particular, the array of LEDs is a two-dimensional array having a regular arrangement of LEDs 10, for example a grid-like arrangement of LEDs. In the schematic cross-sectional view of FIG. 1a, a portion of this two-dimensional array of LEDs 10, namely a section of a linear arrangement of eight LEDs 10, is shown as a merely illustrative example.

The aircraft landing light unit 2 further comprises a lens 12, which is associated with the plurality of LEDs 10. The lens 12 is an exemplary optical system for shaping the light output, as emitted by the aircraft landing light unit 2 through the lens cover 8, from the light emitted by the plurality of LEDs 10. The lens 12 is a rotationally symmetric lens in the exemplary embodiment of FIG. 1a, with the center axis thereof corresponding to the center of the array of LEDs 10. In the exemplary embodiment of FIG. 1a, the lens 12 is a collimating lens focusing the light emitted by the plurality of LEDs 10. It is illustrated via two light rays 20 that the lens 12 carries out a fairly good collimation of the light emitted by the LEDs close to the center of the array of LEDs 10. In this way, LEDs close to the center of the array of LEDs 10 contribute to the light output of the aircraft landing light unit 2 in a narrow angular range.

The aircraft landing light unit 2 further comprises a photo detector 14, mounted to the mounting plate 6. The photo detector 14 is associated with a photo detector lens 18. In the exemplary embodiment of FIG. 1a, the photo detector lens 18 is a rotationally symmetric lens and is arranged with respect to the photo detector 14 in such a way, that the axis through the center of the photo detector lens 18 runs through the photo detector 14. This combination of the photo detector 14 and the photo detector lens 18 is offset with respect to the plurality of LEDs 10 and the lens 12. There is no direct light path from any of the plurality of LEDs 10 to the photo detector 14, whose surface of photo detection is directed towards the photo detector lens 18.

The aircraft landing light unit 2 further comprises a control unit 16, which is connected to the plurality of LEDs 10 and to the photo detector 14. The control unit 16 controls the plurality of LEDs 10. As will be explained below, the control unit 16 takes into account a light detection signal, generated by the photo detector 14 and output to the control unit 16, for controlling the plurality of LEDs 10.

FIG. 1b shows the same aircraft landing light unit 2, as shown in FIG. 1a. However, for illustrative purposes, two other light rays 22 are shown instead of the light rays 20, shown in FIG. 1a. While the light rays 20 of FIG. 1a stem from LEDs close to the center of the plurality of LEDs 10, the light rays 22 of FIG. 1b stem from an LED that is maximally offset from the center of the plurality of LEDs 10, namely from the LED that is uppermost in the viewing direction of FIG. 1b. It can be seen that the collimation by the lens 12 is not as effective for LEDs that are offset from the center of the array of LEDs 10. In this way, the light rays 22, stemming from a maximally offset LED of the array of LEDs 10, contribute to the output light intensity distribution of the aircraft landing light unit over a wider opening angle than the LEDs close to the center of the array of LEDs 10. In the particular example shown, the light rays 22 contribute to a downwards angled portion of the output light intensity distribution in the viewing direction of FIG. 1b. It is apparent from the comparison of FIG. 1a and FIG. 1b that different contributions to the output light intensity distribution of the aircraft landing light unit 2 are made by the individual LEDs of the array of LEDs 10. It is further apparent that the on/off switching and/or the dimming of the individual LEDs may lead to a wide range of different output light intensity distributions that can be achieved with the aircraft landing light unit 2. While the exemplary embodiment of FIGS. 1a and 1b shows a collimating lens 12 and a regular array of LEDs 10 that are arranged side-by-side in a planar manner, the LEDs may be arranged in other configurations and orientations and the optical system may be embodied in other ways. Accordingly, the output light intensity distribution of the aircraft landing light unit 2 may be adapted to a wide variety of usage scenarios and/or particular application demands. The shown aircraft landing light unit 2 is for illustrative purposes only.

Figure 2:
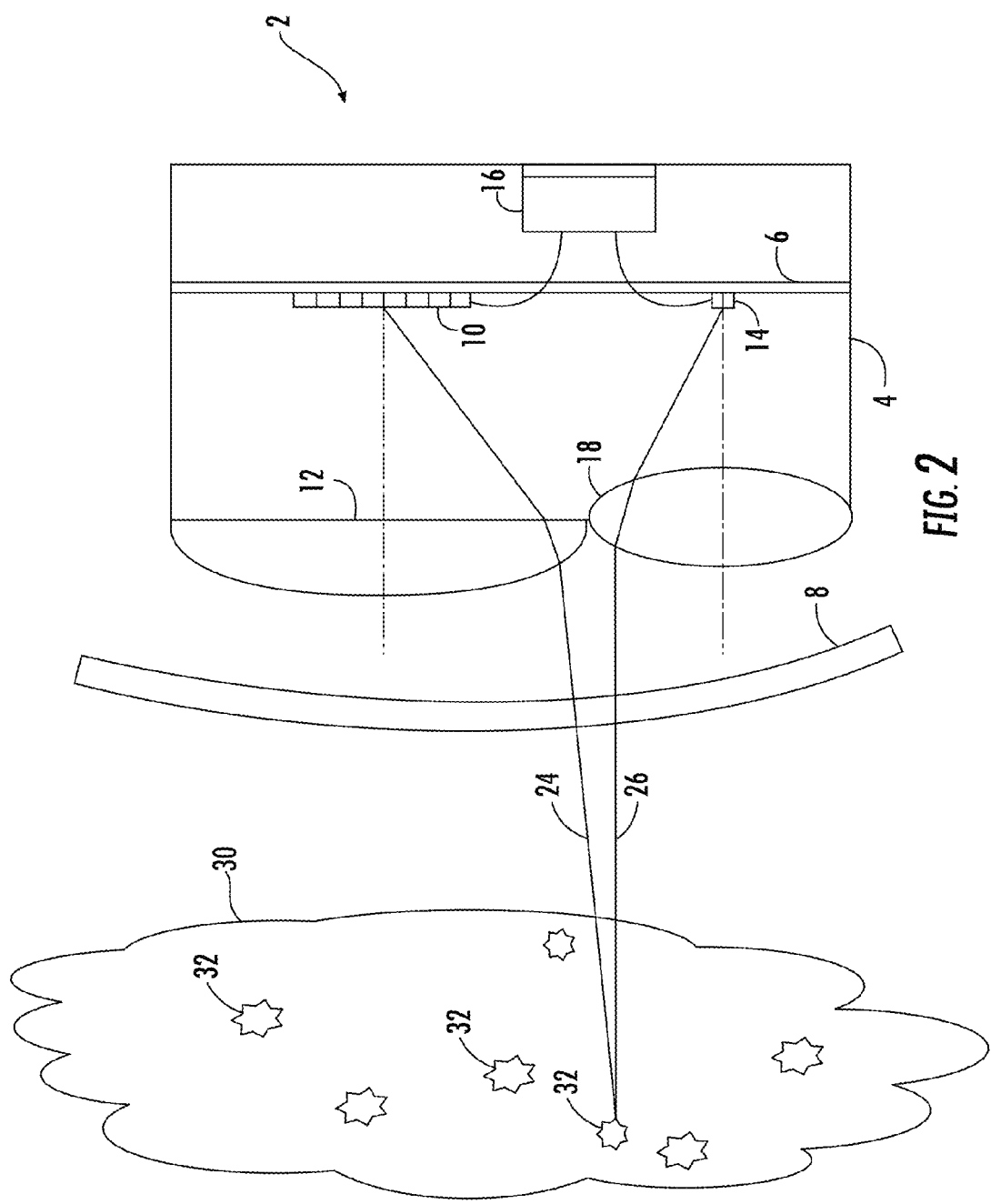
FIG. 2 shows the aircraft landing light unit of FIG. 1 in the presence of a cloud in a schematic manner.

FIG. 2 shows the aircraft landing light unit 2 of FIG. 1 in the course of detecting atmospheric haze. In FIG. 2, a cloud 30 is depicted as an example of atmospheric haze. The cloud 30 is shown in a schematic manner in front of the lens cover 8 of the aircraft landing light unit 2. It is apparent that real clouds are commonly extended structures that are much larger than the aircraft landing light unit 2, in fact much larger than the entire aircraft. In reality, the aircraft landing light unit 2 may be surrounded by a cloud or other atmospheric haze, such as rain, fog or snow. However, in order to illustrate the atmospheric haze detection, the cloud 30 is shown in the depicted illlustrative manner. The cloud 30 comprises droplets 32, which are the particles forming the cloud 30 and which reflect light impinging thereon.

Reference numeral 24 indicates an exemplary light ray that stems from one of the center LEDs of the array of LEDs 10, that is emitted by the aircraft landing light unit 2 via the collimating lens 12 and the lens cover 8, and that is intended to illuminate the runway of an airport during an aircraft approach. It is assumed that the aircraft landing light unit 2 is operated in a nominal operating mode, i.e. in a mode of operation designed for illuminating the airport runway and, potentially, its surroundings in clear sky conditions. Although intended for reaching the airport runway, the light ray 24 hits one of the droplets 32 of cloud 30. The droplet 32 reflects the light ray, with the reflected light ray being indicated with reference numeral 26. The light ray 26 is reflected back towards the aircraft landing light unit 2. In particular, it passes through the lens cover 8 and trough the photo detector lens 18. The photo detector lens 18 re-directs the light ray 26 towards the photo detector 14.

The photo detector 14 detects much more light in the presence of the cloud 30 than in the absence of cloud 30. Although not shown in FIG. 1, it is pointed out that the photo detector 14 also detects light in the absence of cloud 30. On the one hand, the photo detector 14 detects ambient light. On the other hand, even when there is little or no ambient light, such as during night time conditions, the photo detector 14 detects light during the approach of a runway. In particular, light emitted by the plurality of LEDs 10 and reaching the airport runway is diffusely reflected by the same, with a small portion of that light being reflected back towards the aircraft landing light unit 2 and being detected by the photo detector 14. This light can be referred to as an expected reflection value, as it represents the light amount reflected by the airport runway and, potentially, its surroundings in clear sky conditions. In the presence of a cloud or other atmospheric haze, such as fog, rain or snow, the amount of light detected by the photo detector 14 is much larger than this expected reflection value. For example, the amount of light reflected by atmospheric haze may be more than 10 times, in particular more than 20 times, larger than the amount of light reflected by the airport runway in clear sky conditions. The control unit 16 uses this deviation in the amount of detected light as a basis for controlling the plurality of LEDs 10, as will be described below.

The photo detector 14 outputs a light detection signal that indicates the momentary amount of light detected by the photo detector 14. This light detection signal is received by the control unit 16. The control unit 16 compares the momentary amount of light detected by the photo detector, in short referred to as light detected by the photo detector, to a threshold value, referred to as the reflection threshold value. If this reflection threshold value is exceeded, the control unit assumes that the atmospheric haze, such as the cloud 30, is so dense that such a large amount of light is reflected by the atmospheric haze that the pilot's vision is impaired. In other words, the control unit 16 deduces that so much light, emitted by the aircraft landing light unit 2 from the plurality of LEDs 10 via the collimated lens and the lens cover 8, is reflected by the atmospheric haze that the pilot is blinded by the reflected light and cannot properly view the aircraft environment.

It is pointed out that the control unit 16 operates under the assumption that the atmospheric haze is an extended structure. Although the photo detector 14 is not in the aircraft cockpit, as it is in fact in the aircraft landing light unit 2, the control unit 16 assumes that the light detected by the photo detector 14 is a good indicator of the level of reflection directed towards the cockpit. In this way, the level of blinding of the pilot is estimated without the need of providing a separate photo detector in the aircraft cockpit.

The control unit 16 controls the plurality of LEDs 10 on the basis of the light detected by the photo detector 14, in particular on the basis of the light detection signal provided by the photo detector 14. In the exemplary embodiment described with respect to FIG. 2, the control unit 16 controls the plurality of LEDs 10 in such a way that the light output of the aircraft landing light unit 2 is reduced, as compared to the nominal operating mode, upon the light detected by the photo detector 14 exceeding the reflection threshold value.

FIG. 3 shows horizontal cross-sections through various exemplary output light intensity distributions, as emitted by aircraft landing light units in accordance with exemplary embodiments of the invention. The aircraft landing light unit 2 of FIGS. 1 and 2 may emit some or all of these output light intensity distributions in various operating conditions. Hence, all of the output light intensity distributions of FIG. 3 are disclosed in combination with the aircraft landing light unit 2 of FIGS. 1 and 2.

Figure 3A:
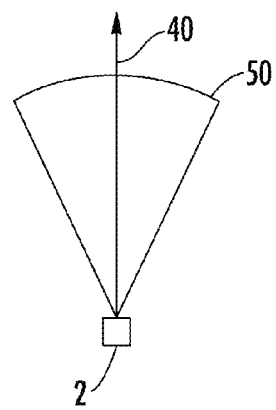
FIG. 3a-FIG. 3f shows horizontal cross-sections through exemplary output light intensity distributions of aircraft landing light units in accordance with exemplary embodiments of the invention.

FIG. 3a shows an exemplary first output light intensity distribution 50, as may be emitted by the aircraft landing light unit 2 in a nominal operating mode. The first output light intensity distribution 50 is depicted with respect to a forward flight direction 40 of the aircraft, to which the aircraft landing light unit 2 is mounted. The first output light intensity distribution has an opening angle of about 50° around the forward flight direction 40 in the depicted horizontal cross-sectional plane, covering about 25° towards the left and towards the right from the forward flight direction 40. The light intensity is roughly constant across this angular range.

Figure 3B:
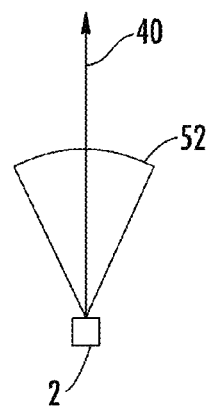

FIG. 3b shows an exemplary second output light intensity distribution 52, as may be emitted by the aircraft landing light unit 2 in a reduced light output mode. The second output light intensity distribution 52 also has an opening angle of about 50° and a roughly constant light intensity across this angular range. However, the light intensity of the second output light intensity distribution 52 is about 70% of the light intensity of the first output light intensity distribution 50.

The first output light intensity distribution 50 and the second output light intensity distribution 52 are related as follows. As a response to the light detected by the photo detector exceeding the reflection threshold value, the control unit dims all LEDs of the aircraft landing light unit 2 in such a way that they emit only 70% of their nominal light intensity. Accordingly, while the overall shape of the output light intensity distribution stays unchanged, the emitted light output is reduced to 70% of the light output in the nominal operating mode.

Figure 3C:
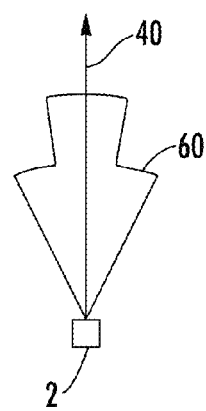

FIG. 3c shows an exemplary third output light intensity distribution 60, as may be emitted by the aircraft landing light unit 2 in a nominal operating mode. The third output light intensity distribution 60 also has an opening angle of about 50° around the forward flight direction 40. However, the light intensity is not constant across this angular range. The light intensity in an angular range of 20° around the forward flight direction 40 is higher than in the remainder of the 50° range. In particular, the light intensity in the angular ranges between −25° and −10° as well as between 10° and 25° is about 70% of the light intensity in the angular range between −10° and 10°. In this way, a strong illumination of the target ahead, e.g. of the runway, is achieved, while the lateral sectors of the aircraft environment are illuminated to a lesser extent. This may be achieved by operating more LEDs contributing to the output light intensity distribution of the aircraft landing light unit over the −10° to 10° angular range and operating less LEDs contributing to the output light intensity distribution of the aircraft landing light unit over the −25° to −10° and 10° to 25° angular ranges.

Figure 3D:
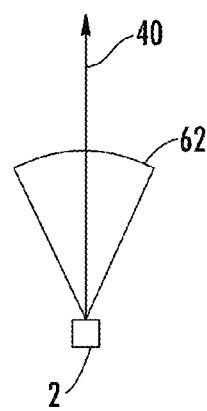

FIG. 3d shows an exemplary fourth output light intensity distribution 62, as may be emitted by the aircraft landing light unit 2 in a reduced light output mode. The fourth output light intensity distribution 62 is equal to the second output light intensity distribution 52.

The third output light intensity distribution 60 and the fourth output light intensity distribution 62 are related as follows. As a response to the light detected by the photo detector exceeding the reflection threshold value, the control unit dims or shuts off some or all of those LEDs that contribute to the third output light intensity distribution 60 in the −10° to 10° angular range. In this way, the light most prone to impairing the pilot's vision is reduced, while keeping the illumination in the lateral sectors unchanged.

Figure 3E:
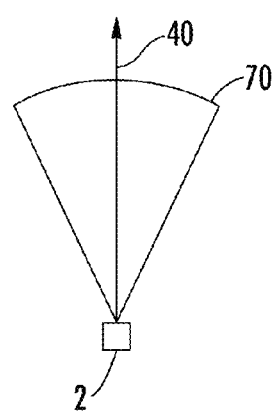

FIG. 3e shows an exemplary fifth output light intensity distribution 70, as may be emitted by the aircraft landing light unit 2 in a nominal operating mode. The fifth output light intensity distribution 70 is equal to the first output light intensity distribution 50.

Figure 3F:
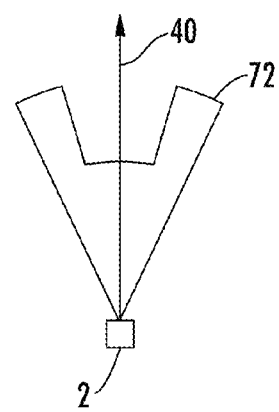

FIG. 3f shows an exemplary sixth output light intensity distribution 72, as may be emitted by the aircraft landing light unit 2 in a reduced light output mode. The second output light intensity distribution 72 also has an opening angle of about 50°. However, the light intensity is not constant across this angular range. While the light intensity is unchanged, as compared to the fifth output light intensity distribution 70, in the angular ranges from −25° to −10° and from 10° to 25°, the light intensity is about 70% of the light intensity of the fifth output light intensity distribution in the angular range from −10° to 10°.

The fifth output light intensity distribution 70 and the sixth output light intensity distribution 72 are related as follows. As a response to the light detected by the photo detector exceeding the reflection threshold value, the control unit dims or shuts off some or all of those LEDs that contribute to the fifth output light intensity distribution 70 in the −10° to 10° angular range. In this way, the light most prone to impairing the pilot's vision is reduced, while keeping the illumination in the lateral sectors unchanged.

It is pointed out that the output light intensity distributions of FIGS. 3a to 3f are for illustrative purposes. Other opening angles, other variations of the light intensity across the opening angles, and other adjustments between the nominal operating mode and the reduced light output mode are also possible.

Figure 4:
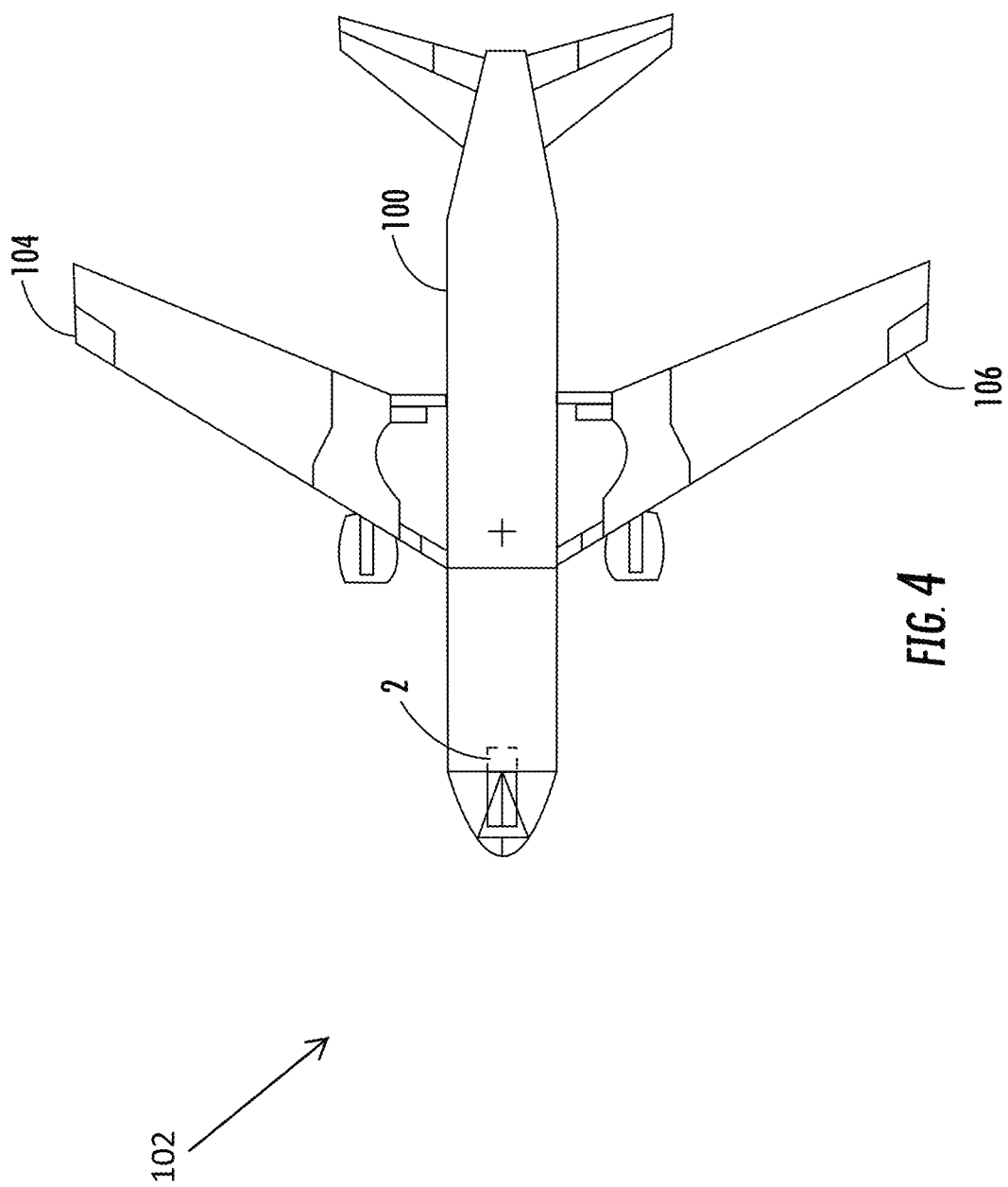
FIG. 4 shows an aircraft with an exterior aircraft lighting system in accordance with exemplary embodiments of the invention.

FIG. 4 shows an aircraft 100 having an exterior aircraft lighting system 102 in accordance with exemplary embodiments of the invention in a top view. The exterior aircraft lighting system 102 has an aircraft landing light unit 2, disposed at the front running gear of the aircraft 100 and as described in any of the embodiments above, a right wing-tip anti-collision light unit 104 and a left wing-tip anti-collision light unit 106. The aircraft landing light unit 2, the right wing-tip anti-collision light unit 104 and the left wing-tip anti-collision light unit 106 are connected to each other. In particular, the right wing-tip anti-collision light unit 104 and the left wing-tip anti-collision light unit 106 are coupled to the photo detector 14 and/or to the control unit 16 of the aircraft landing light unit 2 via suitable signal lines and/or wireless signal interfaces. In the exemplary embodiment of FIG. 4, the right and left wing-tip anti-collision light units 104, 106 are configured to adjust their light output as a response to the light detected by the aircraft landing light unit 2, as described in detail above.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

The invention claimed is:

1. An aircraft landing light unit, comprising:
a plurality of LEDs,
an optical system associated with the plurality of LEDs for shaping a light output of the aircraft landing light unit for illuminating an aircraft environment,
a control unit for controlling the plurality of LEDs, and
a photo detector arranged for detecting light, emitted by the plurality of LEDs, output via the optical system and reflected by atmospheric haze, such as clouds, fog, rain and snow,
wherein the control unit is coupled to the photo detector and is configured to control the plurality of LEDs on the basis of the light detected by the photo detector, thereby adjusting the light output of the aircraft landing light unit to the atmospheric haze.

2. An aircraft landing light unit according to claim 1, wherein the control unit is configured to compare the light detected by the photo detector to a reflection threshold value and to decrease the light output of the aircraft landing light unit as a response to the light detected by the photo detector being above the reflection threshold value.

3. An aircraft landing light unit according to claim 2, wherein the control unit is configured to dim all of the plurality of LEDs as a response to the light detected by the photo detector being above the reflection threshold value.

4. An aircraft landing light unit according to claim 2, wherein the plurality of LEDs comprises a first subset of LEDs and a second subset of LEDs, with the first and second subsets of LEDs being separately controllable, and wherein the control unit is configured to dim the first subset of LEDs as a response to the light detected by the photo detector being above the reflection threshold value.

5. An aircraft landing light unit according to claim 2, wherein the plurality of LEDs comprises a first subset of LEDs and a second subset of LEDs, with the first and second subsets of LEDs being separately controllable, and wherein the control unit is configured to switch off the first subset of LEDs as a response to the light detected by the photo detector being above the reflection threshold value.

6. An aircraft landing light unit according to claim 4, wherein the first subset of LEDs provides for more illumination in a pilot forward vision direction than the second subset of LEDs.

7. An aircraft landing light unit according to claim 4, wherein the second subset of LEDs provides for a broader field of illumination than the first subset of LEDs.

8. An aircraft landing light unit according to claim 2, wherein the reflection threshold value is a fixed threshold value.

9. An aircraft landing light unit according to claim 2, wherein the reflection threshold value is a variable threshold value, set depending on an ambient light level around the aircraft landing light unit.

10. An aircraft landing light unit according to claim 2, wherein the reflection threshold value is at least 10 times as high as an expected reflection value, corresponding to a light reflection from an airport runway in clear sky conditions.

11. An aircraft landing light unit according to claim 1, further comprising a photo detector lens, associated with the photo detector for condensing reflected light towards the photo detector.

12. An exterior aircraft lighting system, comprising:
an aircraft landing light unit according to claim 1, and
at least one further exterior aircraft light unit, the at least one further exterior aircraft light unit being coupled to the photo detector of the aircraft landing light unit and being configured to control its respective light output on the basis of the light detected by the photo detector of the aircraft landing light unit.

13. The exterior aircraft lighting system according to claim 12, wherein the at least one further exterior aircraft light unit is at least one anti-collision light unit.

14. A method of operating an aircraft landing light unit, comprising a plurality of LEDs, an optical system associated with the plurality of LEDs, and a photo detector, the method comprising the steps of:

operating the plurality of LEDs in a nominal operating mode, thereby providing a light output of the aircraft landing light unit for illuminating an aircraft environment, detecting light, emitted by the plurality of LEDs, output via the optical system and reflected by atmospheric haze, such as clouds, fog, rain and snow, controlling the plurality of LEDs on the basis of the light detected by the photo detector, thereby adjusting the light output of the aircraft landing light unit to the atmospheric haze.

15. The method of operating an aircraft landing light unit according to claim 14, further comprising the step of:

comparing the light detected by the photo detector to a reflection threshold value, wherein the step of controlling the plurality of LEDs comprises dimming a subset of the plurality of LEDs as a response to the light detected by the photo detector being above the reflection threshold value.

\* \* \* \* \*